United States Patent
Hucke et al.

(10) Patent No.: US 7,268,181 B2
(45) Date of Patent: Sep. 11, 2007

(54) VOLUME-MODIFIED CASTING COMPOUNDS BASED ON POLYMERIC MATRIX RESINS

(75) Inventors: Thomas Hucke, Dresden (DE); Jens Rocks, Zürich (CH); Uwe Kaltenborn, Baden-Dättwil (CH)

(73) Assignee: ABB Research Ltd, Zurich (CH)

( * ) Notice: Subject to any disclaimer, the term of this patent is extended or adjusted under 35 U.S.C. 154(b) by 362 days.

(21) Appl. No.: 10/332,506

(22) PCT Filed: Jul. 2, 2001

(86) PCT No.: PCT/CH01/00409

§ 371 (c)(1), (2), (4) Date: Jul. 10, 2003

(87) PCT Pub. No.: WO02/06398

PCT Pub. Date: Jan. 24, 2002

(65) Prior Publication Data

US 2004/0249060 A1    Dec. 9, 2004

(30) Foreign Application Priority Data

Jul. 14, 2000    (EP) ................. 00810620

(51) Int. Cl.
*C08J 3/00* (2006.01)
*C08K 3/20* (2006.01)
*C08L 83/00* (2006.01)
*C08L 83/04* (2006.01)
*C08L 63/00* (2006.01)

(52) U.S. Cl. ............. 524/588; 523/400; 523/435; 525/403; 525/437; 525/438; 525/446; 525/474; 525/476; 525/523

(58) Field of Classification Search ........ 523/400, 523/435; 524/588; 525/403, 437, 438, 446, 525/474, 476, 523

See application file for complete search history.

(56) References Cited

U.S. PATENT DOCUMENTS

| | | | |
|---|---|---|---|
| 3,843,577 A | 10/1974 | Keil | |
| 3,859,314 A | 1/1975 | Dukes et al. | |
| 4,667,044 A | 5/1987 | Nees et al. | |
| 4,853,434 A * | 8/1989 | Block | 525/100 |
| 5,691,401 A * | 11/1997 | Morita et al. | 523/435 |

FOREIGN PATENT DOCUMENTS

| | | |
|---|---|---|
| DE | 3634084 A1 | 4/1988 |
| DE | 3738634 A1 | 5/1988 |
| EP | 0230619 A2 | 8/1987 |
| EP | 0266513 A2 | 5/1988 |
| EP | 0297030 A2 | 12/1988 |
| EP | 0356391 A2 | 2/1990 |
| EP | 0407834 A2 | 1/1991 |
| EP | 0462053 A2 | 12/1991 |
| EP | 0506617 A2 | 9/1992 |
| EP | 0536085 A2 | 4/1993 |
| EP | 0553371 A1 | 8/1993 |
| EP | 0685508 A1 | 12/1995 |
| WO | WO98/32138 | 7/1998 |

* cited by examiner

*Primary Examiner*—Patrick Niland
(74) *Attorney, Agent, or Firm*—Buchanan Ingersoll & Rooney PC

(57) ABSTRACT

Bulk-modified potting composition based on a curable epoxy resin or on a mixture of these resins, where the resin or the mixture is composed of an epoxy resin, a hardener, where appropriate an accelerator, and also other additives, such as fillers, flexibilizers, and colorants, which potting composition (a) comprises a three-dimensionally crosslinked polysiloxane in disperse form and with a particle size in the range from 0.02 μm to 50 μm, which, where appropriate, has reactive groups which can react chemically with the epoxy resin and/or the hardener, (b) a selected linear or branched siloxane compound which has reactive groups which can react chemically with the epoxy resin and/or the hardener, and also, where appropriate, (c) a low-molecular-weight oligomeric siloxane compound, the use of the potting composition as an engineering material or as an insulating material, and the moldings and insulation produced therefrom.

56 Claims, No Drawings

VOLUME-MODIFIED CASTING COMPOUNDS BASED ON POLYMERIC MATRIX RESINS

SCOPE OF APPLICATION

The present invention relates to volume-modified potting compositions based on thermoset epoxy resins, with improved hydrophobic properties, suitable for producing electrical insulation. Using these potting compositions of the invention it is possible to produce electrical insulation, in particular in the form of moldings and coatings in the high-voltage insulation sector, these also being suitable for outdoor use.

Technical sector

Insulation based on polymeric matrix resins for outdoor use is known per se. Traditionally insulators based on glass and on ceramic materials are used for outdoor applications. In recent years, polymeric insulating materials have also achieved a constantly increasing market share, and use is often made -of casting compositions based on epoxy resins and on polyurethanes. In the switchgear construction sector, epoxy resins have substantial importance as insulating materials. These epoxy resin systems are also used as insulating materials in the production of measurement transducers, feed-throughs, power switches, dry-type transformers, and electrical machines, and in power electronics, microelectronics, and also in automation technology. The main applications known in the sector of power transmission and power distribution are indoor applications, but there are also a few applications in the outdoor insulation sector.

The composition of the invention provides an excellent method of incorporating intrinsic hydrophobic properties into epoxy resins. It therefore becomes possible to produce moldings from these modified epoxy resins and use these in outdoor conditions where the units currently used are markedly more expensive, made from silicone-composite materials. The excellent mechanical Properties of the epoxy system of the invention mean that- it can be used either as an engineering material or as an insulating material, S without any associated restriction on shaping capabilities.

Epoxy resins currently have a very wide variety of uses in electrical engineering. In the medium-voltage and high-voltage engineering sector, epoxy resins are primarily used as insulating materials. Since a wide range of varied insulating materials with very good electrical properties is available, the main requirements relevant to the usefulness of insulating materials apply to mechanical properties, rather than to dielectric strength. An insulating material is therefore increasingly selected on the basis of further criteria, such as mechanical strength, mechanical flexibility, resistance to UV radiation, processability and variety of available shapes, absence of partial discharge, resistance to tracking, performance in relation to contaminant layers, and freedom from maintenance and resistance to complex electrical and climatic stresses at high humidity.

The components generally present in epoxy resin potting compositions are epoxy resin, hardener, accelerator, filler, and colorant. The mechanical properties are optimized in particular by modifying the epoxy resin/hardener mixture. UV-resistant molding materials have also become available with the development of cycloaliphatic resins. Very good processability and the casting of extremely complicated and/or large- shapes can be achieved through thermal control of the curing reaction, and also through the use of selected hardeners and accelerators. A combination with processing methods such as vacuum casting or pressure gelation also makes it possible to produce homogeneous workpieces with no gas inclusions, and thus ensure the absence of the partial discharge.

However, polymeric insulating materials differ from the traditional solid insulating materials of ceramics and glass in that leakage paths are produced along the surface when discharges occur. Oxidation - mostly incomplete - of the polymer matrix is brought about by the differential introduction of high energy levels and leads to the concentration of conductive, graphitic carbon on the surface. This in turn causes loss of the insulating action of the material. A substantial advance in improving resistance to tracking has been achieved with the use of inorganic fillers. For example, resin systems with a filler level of up to 70% are now known, preferred fillers used being $SiO_2$, $Al_2O_3$, $CaMg(CO_3)_2$ (dolomite).

Despite these good properties, the use of epoxy resin as electrical insulating material in switchgear construction have remained substantially restricted to indoor applications, and this is primarily attributable to inadequate performance in the presence of contaminant layers and inadequate tracking performance, and also inadequate freedom from maintenance. The substantive issue here is low resistance to complex electrical and climatic stress. Studies have shown that failure of insulation components can occur even in indoor systems. For example, if the surface of the epoxy resin has been covered by a contaminant layer and water can condense on the material, the stresses occurring indoors are occasionally markedly greater than those to which outdoor systems are subject, and therefore cause an increased level of failure. When this type of stress arises through condensation of water on the surface, insulating action is substantially dependent on the water-repellency (hydrophobic properties) of the surface on which the water has condensed. In the case of surfaces which are markedly hydrophobic; e.g. as found with silicones, covering of condensed water takes the form of individual, separate droplets. In contrast, in the case of hydrophilic surfaces wetting leads to formation of a film coating which can cause flash-over on the insulator.

Because epoxy resins have polar character, epoxy resin surfaces are unlikely to have hydrophobic properties. Although some degree of hydrophobic properties can be demonstrated on industrial epoxy resin surfaces, these are not intrinsic but are generally the result of the filler used and its pretreatment, and also the use of silicone-containing mold-release agents. It is not possible to utilize these hydrophobic properties in the medium or long term, since they have only extremely low resistance to environmental effects.

PRIOR ART

U.S. Pat. No. 3,843,577 proposes the addition of organopolysiloxane oils to the epoxy resin to improve the epoxy resin surface properties mentioned, in particular their hydrophobic properties. These silicone oils are dispersed in the epoxy resin prior to potting, and after curing are again present in free form within the matrix. This has various mechanical and electrical disadvantages, in particular in the case of high filler levels. The hydrophobic properties are not intrinsically anchored with the material, and demixing of the constituents here has to be expected.

WO 98/32138 proposes adding a liquid, relatively low-molecular-weight oligomeric siloxane compound to the epoxy resin, the siloxane compound having epoxy groups. Although this permits chemical incorporation of this siloxane compound into the epoxy matrix in the curing process, it has been found that, despite the possibility of chemical incorporation into the epoxy matrix, the addition of the low-molecular-weight silicone oil alone creates a liquid phase in the resin system, when the amounts used are those which have to be used for practical purposes. The result is formation of microvoids, which reduce mechanical strength and reduce the level of electrical properties, such as breakdown voltage.

SUMMARY OF THE INVENTION

It has now been found that the disadvantages described above can be considerably mitigated or eliminated if the curable epoxy matrix, which is generally composed of an epoxy resin, a hardener, where appropriate an accelerator, and also other additives, such as fillers, flexibilizers, and colorants, is treated with (a) a three-dimensionally crosslinked polysiloxane in disperse form and with a particle size in the range from 0.02 µm to 50 µm, which, where appropriate, has reactive groups which can react chemically with the epoxy resin and/or the hardener, (b) a selected linear or branched siloxane compound which has reactive groups which can react chemically with the epoxy resin and/or the hardener. Surprisingly, a composition obtained in this way in particular gives considerably improved results in relation to intrinsic hydrophobic properties, and also in relation to recovery of hydrophobic properties after destruction of the hydrophobic properties by external partial discharges. In particular, the results are considerably better than for compositions each of which has only a three-dimensionally crosslinked polysiloxane in disperse form, or only a selected linear or branched siloxane compound which contains reactive groups which can react with the epoxy resin. Marked synergistic action is apparent in relation to mechanical and electrical properties.

The present invention is defined in the claims. In particular, the present invention provides a bulk-modified potting composition based on a curable epoxy resin or on a mixture of these resins, where the resin or the mixture is composed of an epoxy resin, a hardener, where appropriate an accelerator, and also other additives, such as fillers, flexibilizers, and colorants, characterized in that this potting composition (a) comprises a three-dimensionally crosslinked polysiloxane in disperse form and with a particle size in the range from 0.02 µm to 50 µm, which, where appropriate, has reactive groups which can -react chemically with the epoxy resin and/or the hardener, (b) a selected linear or branched siloxane compound which has reactive groups which can react chemically with the epoxy resin and/or the hardener, and also, where appropriate, (c) a low-molecular-weight oligomeric siloxane compound.

The potting composition of the invention is suitable for use either as an engineering material or as an insulating material, in particular for the production of moldings and coatings in the electrical insulation. sector, for example high-voltage insulation, in particular for outdoor use.

The present invention therefore provides the use of the potting composition of the invention as an engineering material, and also as an insulating material, for the production of moldings and coatings in the electrical insulation sector, in particular high-voltage, insulation, in particular high-voltage insulation for outdoor use.

The invention also provides the electrical insulation and engineering components produced from the potting composition of the invention.

The invention also provides a process for preparing the potting compositions of the invention.

Three-dimensionally crosslinked disperse polysiloxanes with an average particle size in the range from 0.02 µm to 0 µm are known from DE 36 34 084 or EP 0 407 834. The component (a) used in the present invention preferably corresponds to the three-dimensionally crosslinked silicones, or the silicone resin dispersions, described in DE 36 34 084 or EP 0 407 834. The contents of DE 36 34 084 and EP 0 407 834 are therefore incorporated herein by reference.

Component (a), i.e. the three-dimensionally crosslinked polysiloxane in disperse form, is preferably prepared separately in the form of a polysiloxane dispersion, composed of an external phase and of a disperse phase, and added to the epoxy potting composition or to a component of the same prior to its processing or its curing. Preparation of dispersions of this type is known per se.

The external phase of the polysiloxane dispersion to be used is preferably composed of from about 25 to 99.9% by weight of a polyol which is polymeric or monomeric and liquid at temperatures of from 20° C. to 100° C., of a linear or branched polyglycol ether, of a polyester based on polyols and on aliphatic,. cycloaliphatic, or aromatic dicarboxylic acids, on acrylate polymers or methacrylate polymers, or else on corresponding copolymers, or on a mixture of compounds of this type which are known to be capable of use as hardeners in epoxy resin systems.

Materials which may in particular be used for the external phase are linear or branched aliphatic polyols, such as ethylene glycol, diethylene glycol, the propylene glycols, butylene glycols, 1,2-butanediol, 1,3-butanediol, 1,4-butanediol, neopentyl glycol, isopentyl glycol, 1,6-hexanediol, glycerol, hexanetriol, trimethylolethane, trimethylolpropane; erythritol, pentaerythritol, cyclohexanediol, or 1,4-dimethylolcyclohexane.

Other materials which may be used as external phase are reaction products of the polyols mentioned with aliphatic, cycloaliphatic, or aromatic dicarboxylic acids, or else tricarboxylic acids, such as those known per se for the use as hardener in epoxy potting compositions. These polyesters containing carboxy groups preferably have an acid value (given in mg KOH/g of polyester) of from 10 co 100. The: polyesters advantageously have a glass transition temperature in the range from 20 to 100° C., and are preferably condensation products of polyols with dicarboxylic acids and, where appropriate, polyfunctional carboxylic acids, or the corresponding carboxylic anhydrides. Suitable polyols are mentioned above. Examples of suitable carboxylic acids are isophthalic acid, terephthalic acid, phthalic acid, methylphthalic acids, tetrahydrophthalic acid, hexahydrophthalic acid, methyltetrahydrophthalic acids, e.g. 4-methyltetrahydrophthalic acid, cyclohexanedicarboxylic acids, succinic acid, glutaric acid, adipic acid, pimelic acid, suberic acid, azelaic acid, sebacic acid, dodecanedicarboxylic acid, fumeric acid, maleic acid, or 4,4'-diphenyldicarboxylic acid. Commercially available polyesters are often based on neopentyl glycol and/or trimethylolpropane as substantive alcohol constituents, and on adipic acid and/or terphthalic acid and/or isophthalic acid and/or trimellitic acid as substantive acid components.

The dispersed phase of the polysiloxane dispersion to be used is preferably composed of from about 0.1 to 75% by weight of one or more three-dimensionally crosslinked polyorganosiloxanes, the average diameter of the crosslinked polyorganosiloxane particles being from 0.02 µm to 50 µm, preferably from 0.05 µm to 10 µm, preferably from 0.07 µm to 5 µm, and preferably from 0.07 µm to 1 µm.

The dispersions may also comprise up to 20% by weight of additives, such as solvents, plasticizers, catalysts, crosslinkers, stabilizers, dispersing agents. Such additives are known per se.

Where appropriate, the surface of these polyorganosiloxane particles have reactive groups by way of which they can be chemically bonded to the -epoxy resin or to the compounds described above as external phase. In preparing the dispersion it is preferable to use an external phase which can subsequently be- used as hardener in the epoxy potting composition. The chemical bonding preferably takes place during the curing of the potting composition. If chemical bonding to the external phase is possible, however, this may take place at least to some extent before addition to the potting composition begins.

A very large number of three-dimensionally crosslinked organopolysiloxanes is known. These are mostly dialkylpolysiloxanes, preferably dimethylpolysiloxanes, but some of the alkyl groups here may have been replaced by phenyl and/or reactive groups known per se. Preferred crosslinking groups which may be used are the following groups:

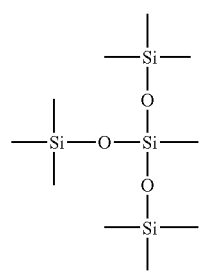

(1)

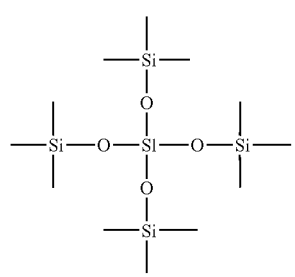

(2)

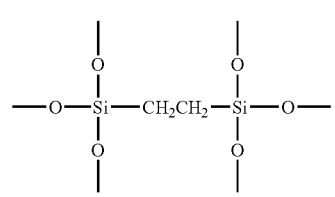

(3)

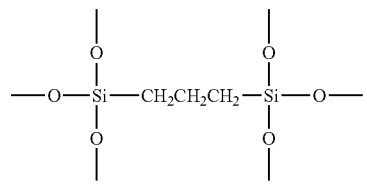

Crosslinking by means of these groups is known per se. For example, the connecting group (3) is produced during the crosslinking reaction of a vinylsiloxane with a hydrosiloxane, while the connecting group (4) is formed during the crosslinking reaction of an allylsiloxane with a hydrosiloxane, in each case in the presence of a suitable catalyst, such as a Pt catalyst known per se.

The free valencies shown in the diagrams for the silicon atoms in the three-dimensionally crosslinked siloxanes here have bonding either to oxygen or hydrogen or to organic radicals which are monovalent or divalent, or have higher valency, and which may be saturated or unsaturated, and which, where appropriate, bear a reactive group. Preference is given to monovalent radicals, which may be identical or different, to linear or branched, where appropriate chlorinated and/or fluorinated alkyl groups having from 1 to 8 carbon atoms, or to ($C_1$-$C_4$)-alkylaryl or aryl; preferably to unfluorinated or fluorinated alkyl having from 1 to 4 carbon atoms or phenyl, preferably to 3,3,3-trifluoropropyl, monofluoromethyl, difluoromethyl, or alkyl having from 1 to 4 carbon atoms, preferably to methyl or phenyl, preferably to methyl.

Particular unsaturated substituents are vinyl or allyl, these substituents generally having direct bonding to the silicon atom. The reactive groups are preferably selected from glycidyl, hydroxy, amino (—$NH_2$), carboxy, and/or hydrogen, in each case bonded to the silicon atom directly or via an organic radical, depending on the nature of the substituent. The substituent hydrogen has direct bonding to the silicon atom.

The substituent which is a reactive group or bears a reactive group therefore preferably has the general formula (a):

$$-(A)_r\text{-(reactive group)} \qquad (a),$$

where

A is a divalent saturated or unsaturated aliphatic radical which may contain one or more oxygen atoms and/or —NH— groups, or phenylene, or is a divalent cycloaliphatic radical, or a divalent aromatic radical, where in each case a reactive group has been bonded to a free valency of this divalent radical.

If A is a divalent saturated aliphatic radical it is preferably a radical of the formula —$C_eH_{2e}$—, preferably —$(CH_2)_s$—, where s is an integer from 1 to 6, preferably 1, 2 or 3, and r is zero or 1.

The term "-(reactive group)-" preferably means hydrogen, vinyl or allyl, these substituents generally having direct. bonding to the silicon atom. (r=zero), or glycidyl, hydroxy (—OH), amino (—$NH_2$), and/or carboxy, where the bonding of hydroxy to the silicon atom may be direct or by way of the linker A.

If the -(reactive group)- is glycidyl, the radical of the formula (a) is preferably a 3-glycidoxypropyl radical, where the silicon atom to which the 3-glycidoxypropyl radical has been bonded preferably forms a divalent methyl(3-glycidoxypropyl)siloxy radical.

If A is a divalent cycloaliphatic radical it is preferably cyclohexylene; if it is a divalent aromatic radical it is preferably phenylene, preferably meta- or para-phenylene.

If A is a saturated or unsaturated aliphatic radical substituted by phenylene, where in each case the reactive group occupies one free valency, it is preferably —(CH$_2$)$_e$—(C$_6$H$_4$)—, the bonding of the reactive group preferably being to the phenylene radical, preferably in meta or para position. Examples of preferred radicals of the formula (a) are moreover: m-aminophenyl or p-aminophenyl [H$_2$N—(C$_6$H$_4$)—], 3-(m-aminophenoxy)propyl [H$_2$N—(C$_6$H$_4$)—OCH$_2$CH$_2$CH$_2$—], 3-(2-aminoethyl)aminopropyl [H$_2$NCH$_2$CH$_2$NH(CH$_2$)$_3$—], and hydroxymethyl [HO—CH$_2$—].

The methods for the preparation of these three-dimensionally crosslinked siloxanes and siloxane dispersions are known per se.

In the preferred procedure, the three-dimensionally crosslinkable polyorganosiloxanes to be used as starting materials, where appropriate having reactive groups, are dispersed in the external phase, where appropriate together with other auxiliaries, preferably at temperatures of from 20 to 100° C., and this dispersed phase is dispersed until the average droplet diameter of the dispersed particles/droplets is in the range from 0.02 μm to 50 μm, and then the components of the dispersed phase are three-dimensionally crosslinked to form solid particles.

The particle size of the dispersed three-dimensionally crosslinked polysiloxane particles, their average molecular weight, their chemical makeup, their viscosity, and therefore their mechanical properties, can readily be varied by the skilled worker in order to optimize properties in a particular case. The particle size is an important factor, and the reactive groups located on the surface of the particle can certainly be an important factor.

A non-critical factor when preparing the dispersion is the proportion of the disperse phase in the external phase, i.e. concentration of the crosslinkable polyorganosiloxanes in the external phase. This is more dependent on the effective concentration limit for the disperse phase, and the dispersion here should be regarded as a "masterbatch" which is a component added to the epoxy potting composition. For example, the dispersion may comprise from 0.1t by weight to 75% by weight of dispersed polysiloxane. The preparation of dispersions of this type is known per se.

There are many known crosslinking reactions in the sector of silicone compounds. This matter has been described previously and is known to the skilled worker. For example, vinylsiloxanes can be crosslinked using hydrosilane compounds in the presence of suitable catalysts, e.g. Pt catalysts, by means of an addition reaction. However, silanes can also be crosslinked by condensation, using alkoxysilanes, or use can be made of foreign compounds, such as tetrabutyltitanate or stannous octoate.

The preferred component (b) used, i.e. the linear or branched siloxane compound having reactive groups, is a flowable polyorganosiloxane, for example a polydimethylsiloxane which, where appropriate, alongside the reactive groups has other substituents, such as phenyl, cyclohexyl, fluorinated and/or chlorinated organic substituents, —CHF units, —CF$_2$ units, —CF$_3$ units, —CHCl units, —C(Cl)$_3$ units, and/or —C(Cl)$_3$ units. The compound of component (b) preferably has a viscosity in the range from about 50 cSt to 10,000 cSt, preferably in the range from 100 cSt to 10,000 cSt, and preferably in the range from 500 cSt to 3000 cSt, measured to DIN 53 019 at 20° C.

Component (b) is preferably a compound, or a mixture of compounds, of the general formula (I):

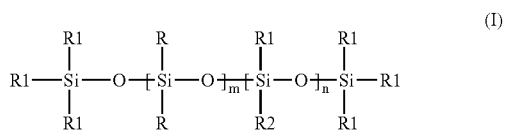

where

R are, independently of one another, a linear, branched or cyclic, where appropriate chlorinated and/or fluorinated, alkyl radical having from 1 to 8 carbon atoms, (C$_1$-C$_4$)-alkylaryl, or aryl; preferably an unfluorinated or fluorinated alkyl radical having from 1 to 4 carbon atoms, or phenyl; preferably phenyl, 3,3,3-trifluoropropyl, monofluoromethyl, difluoromethyl, or alkyl having from 1 to 4 carbon atoms; preferably methyl;

R$_1$ are, independently of one another, as defined for R or R$_2$, where two terminal substituents R$_1$ bonded to different Si atoms represent, where appropriate, an oxygen atom (=cyclic compound);

R$_2$ is as defined for R or is a -(A)$_r$- (reactive group) radical, where -(A)$_r$-(reactive group) is as defined above;

m has an average of from 0 to 5000, preferably from 20 to 5000, preferably from So to 1500;

n has an average of from 0 to 100, preferably from 2 to 100, preferably from 2 to 20;

where (i) the compound of the formula (I) has at least two reactive groups per molecule, (ii) the total [m+n] for non-cyclic compounds is at least 20, preferably at least 50, and (iii) the arrangement of the —[Si(R)(R)O]— and —[Si(R$_1$)(R$_2$)O]— group s in the molecule is in any desired sequence. The total (m+n) for non-cyclic compounds is, on average, preferably in the range from 20 to 10,000, preferably in the range from 50 to 1500.

The ratio of methyl to phenyl (in relation to the definition of R) is prescribed by the flowability of the compound or of the mixture of compounds. R is prefer ably methyl. The compound of the formula (I) is generally a mixture of compounds of the formula (I), as is known to the skilled worker.

The reactive groups of component (b) are preferably the same as those of component (a). Likewise, the linker -A- in component (b) is preferably the same as in component (a). The preferred reactive groups of component (b) are therefore: -3-glycidoxypropyl, where the silicon atom to which the 3-glycidoxypropyl radical has been bonded preferably forms a divalent methyl(3-glycidoxypropyl)siloxy radical, m-aminophenyl, or p-aminophenyl, 3-(m-aminophenoxy)propyl, {3-(2-aminoethyl)aminopropyl}, and hydroxymethyl.

If the compound of the formula (I) is a cyclic compound, it is then composed of —[Si(R)(R)o]— and/or —[SiR$_1$(R$_2$)O]— units, which form a ring preferably having from 4 to 12 of these units. However, among the cyclic siloxanes, preference is given to the cyclic oligomeric polysiloxanes having from 4 to 8 siloxy units, where these have at least 2 reactive groups.

The low-molecular-weight oligomeric siloxane compound present where appropriate is a compound which (i) is composed of —[Si(R)(R)O]— units which have terminal —OSi(R)₃ groups or terminal —Si(R)₃. groups, or (ii) is a cyclic compound of the formula [Si(R)(R)O]$_t$, where t is an integer from 4 to 12, preferably from 4 to 8. This low-molecular-weight oligomeric siloxane compound has no reactive groups.

The entirety of component (a) and of component (b), based on the total amount of the potting composition of the invention, is preferably from 0.1% by weight to 30% by weight, preferably from 0.59 by weight to 10% by weight, and in particular from about 2 to 5% by weight.

The ratio by weight of component (a) to component (b) is preferably in the range from 5:1 to 1:5, preferably in the range from 5:1 to 2:1, and is preferably about 4.4:1.

The amount of the low-molecular-weight olicomeric siloxane compound is preferably from 0.1% by weight to 10% by weight, preferably from 0.5% by weight to 5% by weight, and in particular about it by weight, based on the total weight of the mixture.

The other additives to be used where appropriate are added in amounts known per se.

To prepare the bulk-modified potting composition of the invention, the underlying components of the curable epoxy resin, i.e. the epoxy resin, the hardener, the accelerator present where appropriate, and also the other additives, such as fillers and colorants, can be mixed in any desired sequence. Prior to, during, or following the mixing process, this mixture is treated with the dispersion of component (a), i.e. the three-dimensionally crosslinked polysiloxane in disperse form, component (b), i.e. the selected linear or branched siloxane compound containing reactive groups,. and, where appropriate, component (c), i.e. the low-molecular-weight oligomeric siloxane compound.

In the preferred procedure, depending on the active groups present in components (a) and (b), these components are premixed. If components (a) and (b) contain epoxy groups, these two components are preferably mixed with the epoxy resin containing epoxy groups, before they are then used to prepare the potting composition. If, on the other hand, components (a) and (b) contain hydroxy, amino, or carboxy, these components are preferably mixed with the hardener, before they are then used to prepare the potting composition.

In particular cases it is advantageous for at least some of the components (a) and (b) containing epoxy groups to be premixed with the hardener and also to be pre-cured, or for at least some of the components (a) and (b) containing hydroxy, amino or carboxy to be premixed with the epoxy resin and also to be pre-cured. This has a positive effect on the distribution of the silicone components in the potting composition and therefore on the physical and mechanical properties of the cured product.

Component (c) is preferably first mixed with components (a) and/or (b) before use thereof for preparing the potting composition.

The potting compositions of the invention in liquid or paste form are curable thermoset epoxy casting resin systems. Preference is given to those with good electrical properties, and preference is given to aromatic and/or cycloaliphatic epoxy resins. Epoxy resins of this type used in the electrical industry are known per se from the literature and can be used according to the invention. Epoxy resins which can be used in the electrical industry are known to be supplied by various producers. There are also numerous publications concerning the Araldit® electrical casting resin systems from Ciba-Geigy AG.

Epoxy resins for electrical applications generally comprise a glycidyl compound or a mixture of glycidyl compounds, and at least one hydroxy-containing compound, or a mixture of these compounds, and/or a carboxy-containing polymer, in particular a carboxy-terminated polyester, and/or a carboxy-containing acrylate polymer and/or a carboxy-containing methacrylate polymer, and also, where appropriate, an accelerator for the crosslinking reaction of the glycidyl compound(s) with the hydroxy-containing compound and/or with the carboxy-containing polymer, and also other additives conventional per se.

Preference is given to glycidyl compounds with crosslinking action which have at least two 1,2-epoxy groups in the. molecule. It is preferable to use a mixture of polyglycidyl compounds, for example a mixture of diglycidyl and triglycidyl compounds. These compounds are known per se and are described in detail in the literature. From the known glycidyl compounds it is generally possible to arrive at a suitable selection for the intended electrical application, this being an optimization problem for the skilled worker.

Suitable glycidyl compounds are described by way of example in EP-A-0 297 030, EP-A-0 356 391, EP-A-0 462 053, EP-A-0 506 617, EP-A-0 536 085, or in U.S. Pat. No. 3,859,314, or in DE-A-31 26 411. These encompass compounds which have unsubstituted glycidyl groups and/or have glycidyl groups substituted with methyl groups. The glycidyl compounds preferably have a molecular weight of from 200 to 1200, in particular from 200 to 1000, and can be solid or liquid. Their epoxide content is preferably at least three equivalents per kilogram of the compound, preferably at least four equivalents per kilogram, and in particular at least five equivalents per kilogram. Preference is given to glycidyl compounds which have glycidyl ether and/or glycidyl ester groups. A glycidyl compound here may also contain both types of glycidyl groups, e.g. glycidyl 4-glycidyloxybenzoate. Preference is given to polyglycidyl esters having from 1 to 4 glycidyl ester groups, in particular diglycidyl esters and/or triglycidyl esters. The preferred diglycidyl esters preferably derive from aromatic, araliphatic, cycloaliphatic, heterocyclic, heterocyclic-aliphatic, or heterocyclic-aromatic dicarboxylic acids having from 6 to 20, in particular from 6 to 12, ring carbon atoms, or from aliphatic dicarboxylic acids having from 2 to 10 carbon atoms. Examples of these compounds are commercially available with the trade name Araldit® (Ciba SC Ltd). Examples of preferred resins are the epoxy resins known per se and based on polyhydric aromatic or cycloaliphatic hydroxy compounds. Examples of known compounds based on aromatic hydroxy compounds are the glycidyl ethers of bisphenol A or bisphenol F, and also the glycidyl ethers of phenol novolak resins or of cresol novolak resins. Examples of cycloaliphatic epoxy resins are bisepoxidized beta-1',2', 3',6'-tetrahydrophenylethyl 1,2,3,6-tetrahydrobenzoate and bisglycidyl hexahydro-o-phthalate. Aliphatic epoxy resins, e.g. 1,4-butanediol diglycidyl ether, are also suitable for the use according to the invention.

Hydroxy-containing compounds and/or carboxy-containing polymers to be used as hardeners, in particular carboxy-terminated polyesters and/or carboxy-containing acrylate polymers and/or carboxy-containing methacrylate polymers, are known per se, as are accelerators to be used where appropriate for the crosslinking reaction of the glycidyl compounds, and other additives conventional per se.

Preference is given to the use of potting compositions which comprise at least one filler. These fillers are preferably powder quartz, aluminum oxide, and/or dolomite ground to various sizes known per se. Silanized fillers are preferred in order to ensure ideal chemical bonding of the particles within the resin matrix.

The potting compositions of the invention are in particular used for the production of high-voltage insulation for outdoor use, in particular for the production of outdoor insulators for high-voltage lines, these being longitudinal rod insulators, composite. insulators, or cap-tight insulators, and also for post insulators in the medium-voltage sector. The potting compositions of- the invention may also be used in the production of insulation for outdoor power switches, measurement transducers, feed-throughs, and suppressors, in switchgear construction, in power switches, in dry-type transformers, and in electrical machines. The potting compositions of the invention may moreover also be used as coating materials for transistors and other semiconductor elements, and very generally for the impregnation of electrical components. The potting composition of the invention may also be used as corrosion protection for metallic components, e.g. for bridges and industrial plants, the gloss of the layer also being retained here after aging, for example.

The molding here is produced or cast in a single step or in two or more steps. For example, one method is to begin by casting a core, in the material of which no potting composition of the invention is present. In a second casting step, the finished shape is then produced by coating the core with the potting material of the invention. The core here may be composed of any suitable material, for example even of a fiber-reinforced plastic. The core used preferably comprises a material which is compatible with the potting material of the invention, and in particular can enter into chemical bonding therewith. This applies particularly when the core is composed of an unmodified casting resin and the coating is composed of a casting resin modified according to the invention. Another possible method is to cast the potting material of the invention onto a core, where the core does not enter into any chemical bonding with the polymer matrix of the casting material, but a sufficiently strong mechanical bond is produced between the core and the cast-on portion due to the pressure generated by shrinkage of the casting material.

The example below illustrates the invention.

EXAMPLE 1 (PREPARATION OF THE POTTING COMPOSITION OF the invention and production of test specimens)

a) 11.1 parts (parts by weight) of a cycloaliphatic epoxy resin (CY 184, Ciba-Geigy AG, Basle) are mixed vigorously, using a shearing mixing head and a stirrer speed of 1400 revolutions per minute at a temperature of 50° C., with 15.5 parts of the anhydride hardener HT 907 (Ciba-Geigy AG, Basle), and also with 11.1 parts of a dispersion [component (a)] of a cycloaliphatic epoxy resin (external phase), comprising a three-dimensionally crosslinked silicone resin (dispersed phase) having epoxy groups and an average particle size of from 0.1 μm to 3 μm (ALBIDUR EP 5340, hanse chemie GmbH, D-21502 Geesthact, Germany), producing a dispersion comprising the three-dimensionally crosslinked silicone resin. The mixture is then degassed at about 100 mbar.

b) The mixture obtained in a) is now treated with 2 parts of a viscose epoxy-functionalized dimethylpoly-siloxane [component (b) (L-9300, Witco (Europe) S. A.)], comprising about 6% by weight of octamethylcyclotetrasiloxane [component (c)] under the conditions stated (vigorous stirring, increased temperature).

c) 0.3 part of accelerator (DY 062, Ciba-Geigy, Basle), 60 parts of silanized powdered quartz are added isothermally in a vacuum mixer (toothed-wheel stirrer) to the mixture obtained in b). Premixing is carried out for 10 minutes at 800 rpm at a temperature of 65° C. The mixture is then degassed at 200 mbar. The mixture is then vigorously mixed with the mixture obtained in b). The resultant casting resin is evacuated in a receiver and vacuum-cast in a casting mold heated to 80° C. After a gelling time of 4 hours at 80° C., the test specimens are removed from the casting mold and post-cured at 140° C. for 10 hours. This gives a sheet of thickness 4 mm, which is processed to give test specimens.

Test results

Test method for measuring the level of hydrophobic properties, the retention of hydrophobic properties, and the recovery of hydrophobic properties, and also results compared between (i) the test specimens produced from cured casting resin without addition of components (a) and (b), (ii) the test specimens produced from cured casting resin with addition of components (a) and (b), and (iii) the test specimens produced from cured casting resin with addition of component (a).

To test the electrical performance of the test specimens, these are subjected to an electrical corona discharge for a period of at least 24 hours, or preferably 48 hours. This temporarily reduces the level of, or entirely eliminates, the hydrophobic properties on the surface, and is followed by a recovery of hydrophobic properties. The level of hydrophobic properties is measured in a manner known per se, using the dynamic advancing angle with water in degrees (°) The greater the advancing angle, the higher the level of hydrophobic properties. Table 1 gives the underlying level of hydrophobic properties, measured using the static contact angle in (°). Tables 2, 3, and 4 indicate the recovery of hydrophobic properties after the corona aging. All three aging and measurement cycles use the same test specimens.

The mechanical properties measured for both test specimens are substantially of comparable order of size, and in every case are above the usage values required.

TABLE 1

| | Static contact angle (water, in (°), test specimen of experiment (i) | Static contact angle (water, in (°), test specimen of experiment (ii) | Static contact angle (water, in (°), test specimen of experiment (iii) |
|---|---|---|---|
| Underlying level of hydrophobic properties | 77.5 | 90 | 87.5 |

TABLE 2

| First period of corona aging, aging time t = 48 h | Dynamic contact angle (water, in (°), test specimen of experiment (i) | Dynamic contact angle (water, in (°), test specimen of experiment (ii) | Dynamic contact angle (water, in (°), test specimen of experiment (iii) |
|---|---|---|---|
| Level of hydrophobic properties directly after corona discharge | 0 | 0 | 0 |
| Level of hydrophobic properties after 2 h | 40 | 45 | 40 |

TABLE 2-continued

| First period of corona aging, aging time t = 48 h | Dynamic contact angle (water, in (°), test specimen of experiment (i) | Dynamic contact angle (water, in (°), test specimen of experiment (ii) | Dynamic contact angle (water, in (°), test specimen of experiment (iii) |
|---|---|---|---|
| Level of hydrophobic properties after 4 h | 40 | 55 | 45 |
| Level of hydrophobic properties after 24 h | 45 | 53 | 47 |
| Level of hydrophobic properties after 48 h | 47 | 62 | 50 |
| Level of hydrophobic properties after 72 h | 49 | 69 | 50 |
| Level of hydrophobic properties after 96 h | 50 | 69 | 50 |

TABLE 3

| Second period of corona aging | Dynamic contact angle (water, in (°), test specimen of experiment (i) | Dynamic contact angle (water, in (°), test specimen of experiment (ii) | Dynamic contact angle (water, in (°), test specimen of experiment (iii) |
|---|---|---|---|
| Level of hydrophobic properties directly after corona discharge | 0 | 0 | 0 |
| Level of hydrophobic properties after 2 h | 35 | 45 | 40 |
| Level of hydrophobic properties after 4 h | 35 | 45 | 45 |
| Level of hydrophobic properties after 24 h | 38 | 59 | 47 |
| Level of hydrophobic properties after 48 h | 39 | 62 | 50 |
| Level of hydrophobic properties after 72 h | 45 | 69 | 50 |
| Level of hydrophobic properties after 96 h | 45 | 70 | 50 |

TABLE 4

| Third period of corona aging | Dynamic contact angle (water, in (°), test specimen of experiment (i) | Dynamic contact angle (water, in (°), test specimen of experiment (ii) | Dynamic contact angle (water, in (°), test specimen of experiment (iii) |
|---|---|---|---|
| Level of hydrophobic properties directly after corona discharge | 0 | 0 | 0 |
| Level of hydrophobic properties after 24 h | 30 | 45 | 32 |
| Level of hydrophobic properties after 100 h | 33 | 55 | 40 |
| Level of hydrophobic properties after 200 h | 38 | 60 | 40 |
| Level of hydrophobic properties after 300 h | 40 | 66 | 41 |
| Level of hydrophobic properties after 400 h | 40 | 70 | 43 |
| Level of hydrophobic properties after 500 h | 40 | 70 | 45 |

The invention claimed is:

1. A bulk-modified potting composition comprised of a curable epoxy resin or a mixture of epoxy resins, where the resin or the mixture is composed of an epoxy resin, a hardener, optionally an accelerator, and also other additives selected from the group consisting of fillers, flexibilizers, and colorants, wherein the potting composition further comprises (a) a three-dimensionally crosslinked polysiloxane in disperse form and with a particle size in the range from 0.02 µm to 50 µm, which, optionally, has reactive groups which can react chemically with the epoxy resin and/or the hardener, and (b) a selected linear or branched or cyclic polysiloxane compound which has reactive groups which can react chemically with the epoxy resin and/or the hardener, and optionally, (c) a low-molecular-weight oligomeric siloxane compound, wherein the three-dimensionally crosslinked polysiloxane (component (a)) is prepared separately in the form of a polysiloxane dispersion composed of an external phase and a dispersed phase, and is added to the epoxy potting composition or to a component of the composition prior to its curing, wherein the external phase of the polysiloxane dispersion is composed of from about 25 to 99.9% by weight of a polyol which is liquid at temperatures of from 20° C. to 100° C., a linear or branched polyether glycol, a polyester which is a reaction product of a polyol and an aliphatic dicarboxylic acid, a cycloaliphatic dicarboxylic acid, or an aromatic dicarboxylic acid, an acrylate polymer or copolymer capable of being used as a hardener in an epoxy resin system, a methacrylate polymer or copolymer capable of being used as a hardener in an epoxy resin system, or a mixture thereof.

2. The potting composition as claimed in claim 1, wherein the external phase is composed of at least one linear or branched aliphatic polyol.

3. The potting composition as claimed in claim 2, wherein the external phase is composed of at least one reaction product derived from a polyol as claimed in claim 2 with aliphatic, cycloaliphatic, or aromatic dicarboxylic acids or tricarboxylic acids, these being suitable for the use as hardener in epoxy potting compositions.

4. The potting composition as claimed in claim 3, wherein the reaction products containing carboxy groups or polyesters containing carboxy groups have an acid value (given in mg KOH/g of polyester) of from 10 to 100.

5. The potting composition as claimed in claim 3, wherein the reaction products containing carboxy groups or polyesters containing carboxy groups have a glass transition temperature in the range from 20 to 100° C.

6. The potting composition as claimed in claim 2, wherein the reaction products containing carboxy groups or polyesters containing carboxy groups are a condensation product of a polyol as claimed in claim 2 and of a dicarboxylic acid and/or of a polyfunctional carboxylic acid, or of the corresponding carboxylic anhydrides.

7. The potting composition as claimed in claim 3, wherein the reaction product containing carboxy groups is prepared from neopentyl glycol and/or trimethylolpropane as substantive alcohol component and from adipic acid and/or terephthalic acid and/or isophthalic acid and/or trimellitic acid as substantive acid component.

8. The potting composition as claimed in claim 1, wherein the dispersed phase of the polysiloxane dispersion is composed of from about 0.1 to 75% by weight of one or more three-dimensionally crosslinked polyorganosiloxanes.

9. The potting composition as claimed in claim 1, wherein the dispersion of the component (a) optionally comprises up to 20% by weight of additives.

10. The potting composition as claimed in claim 1, wherein the dispersed polyorganosiloxane particles of component (a) have, at their surface, reactive groups by way of which they can be chemically bonded to the epoxy resin or to the compound(s) of the external phase.

11. The potting composition as claimed in claim 1, wherein some of the silicon atoms of the three-dimensionally crosslinked organopolysiloxane have been bonded to organic radicals which are monovalent, divalent, or have higher valency, and which may be saturated or unsaturated, and which optionally bear a reactive group.

12. The potting composition as claimed in claim 1, wherein some of the silicon atoms of the three-dimensionally crosslinked organopolysiloxane have bonding to monovalent radicals, which may be identical or different, optionally to linear or branched, optionally chlorinated and/or fluorinated alkyl groups having from 1 to 8 carbon atoms, or to $(C_1$-$C_4)$-alkylaryl or aryl.

13. The potting composition as claimed in claim 1, wherein the substituent which is a reactive group or bears a reactive group has the general formula (a):

-(A)$_r$-(reactive group)              (a), where
A is a divalent saturated or unsaturated aliphatic radical which may contain one or more oxygen atoms and/or —NH— groups, or phenylene, or is a divalent cycloaliphatic radical, or a divalent aromatic radical, where in each case a reactive group has been bonded to a free valency of this divalent radical, and the term "reactive group" means hydrogen, vinyl, or allyl, the substituents generally having been bonded directly to the silicon atom (r-zero), or glycidyl, hydroxy (—OH), amino (—NH$_2$), and/or carboxy, where hydroxy has bonded directly or by way of the linker A to the silicon atom.

14. The potting composition as claimed in claim 1, wherein the substituent formula (a) is 3-glycidoxypropyl, m-aminophenyl, p-aminophenyl, 3-(m-aminophenoxy)-propyl, 3-(2-aminoethyl) aminopropyl or hydroxymethyl.

15. The potting composition as claimed in claim 1, wherein component (b) is a flowable polyorganosiloxane compound whose viscosity is in the range from 50 cSt to 10,000 measured to DIN 53 019 at 20° C.

16. The potting composition as claimed in claim 1, wherein component (b) is a compound, or a mixture of compounds, of the general formula (I):

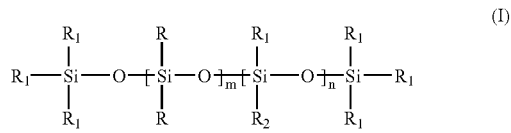

where
R are, independently of one another, a linear, branched or cyclic, optionally chlorinated and/or fluorinated, alkyl radical having from 1 to 8 carbon atoms, $(C_1$-$C_4)$-alkylaryl, or aryl $R_1$ are, independently of one another, as defined for R or $R_2$, where two terminal substituents $R_1$ bonded to different Si atoms represent, optionally an oxygen atom (=cyclic compound);

$R_2$ is as defined for R or is a -(A)$_r$-(reactive group) radical, where -(A)$_r$-(reactive group) is as defined in claim 9 or 10;

m has an average of from 0 to 5000
n has an average of from 0 to 100 where (i) the compound of the formula (I) has at least two reactive groups per molecule, (ii) the total [m+n] for non-cyclic compounds is at least 20 and (iii) the arrangement of the -[Si(R)(R)O]- and -[Si(R$_1$)(R$_2$)O]— groups in the molecule is in any desired sequence.

17. The potting composition as claimed in claim 1, wherein component (b) is a cyclic compound or a mixture of cyclic compounds, of the general formula (I), which is composed of —[Si(R)(R)O]— and/or —[SiR$_1$(R$_2$)O]— units of these units, this compound having at least two reactive groups per molecule.

18. The potting composition as claimed in claim 1, wherein the low-molecular-weight oligomeric siloxane compound present is optionally a compound which (i) is composed of —[Si(R)(R)O]— units which have terminal —OSi(R)$_3$ groups or terminal —Si(R)$_3$ groups, or (ii) is a cyclic compound of the formula [Si(R)(R)O]$_t$, where t is an integer from 4 to 12, this low-molecular-weight oligomeric siloxane compound having no reactive groups.

19. The potting composition as claimed in claim 1, wherein the entirety of component (a) and of component (b) amounts to from 0.1% by weight to 30% by weight, based on the total amount of the potting composition.

20. The potting composition as claimed in claim 1, wherein the ratio by weight of component (a) to component (b) is in the range from 5:1 to 1:5.

21. The potting composition as claimed in claim 1, wherein the amount of the low-molecular-weight oligomeric siloxane compound is from 0.1% by weight to 10% by weight, based on the total weight of the mixture.

22. The potting composition as claimed in claim 1, further comprising at least one filler.

23. A process for preparing a potting composition, the process comprising mixing components of a curable epoxy resin, the components comprising an epoxy resin, a hardener, optionally an accelerator and other additives selected from the group consisting of a filler, a flexibilizer and a colorant, in any desired sequence and, prior to, during or following the mixing process, adding to the resultant mixture a three-dimensionally crosslinked polysiloxane in disperse form (component (a)), a selected linear or branched siloxane compound containing reactive groups (component (b)), and optionally a low-molecular-weight oligomeric siloxane compound (component (c)) to obtain a potting composition comprising (a) the three-dimensionally crosslinked polysiloxane in disperse form and with a particle size in the range from 0.02 μm to 50 μm, which, optionally, has reactive groups which can react chemically with the epoxy resin and/or the hardener, and (b) the selected linear or branched or cyclic polysiloxane compound which has reactive groups which can react chemically with the epoxy resin and/or the hardener, and optionally, (c) the low-molecular-weight oligomeric siloxane compound, wherein the three-dimensionally crosslinked polysiloxane (component (a)) is prepared separately in the form of a polysiloxane dispersion composed of an external phase and a dispersed phase, and is added to the epoxy potting composition or to a component of the same prior to its curing, wherein the external phase of the polysiloxane dispersion is composed of from about 25 to 99.9% by weight of a polyol which is liquid at temperatures of from 20° C. to 1 00° C., a linear or branched polyether glycol, a polyester which is reaction product of a polyol and an aliphatic dicarboxylic acid, a cycloaliphatic dicarboxylic acid, or an aromatic dicarboxylic acid, an acrylate polymer or copolymer capable of being used as a hardener in an epoxy resin system, a methacrylate polymer or copolymer capable of being used as a hardener in an epoxy resin system, or a mixture thereof.

24. The process for preparing a potting composition as claimed in claim 23, wherein at least part of the components (a) and (b) containing epoxy groups is premixed with the hardener, and the mixture is pre-cured, or at least part of the components (a) and (b) containing hydroxy, amino, or carboxy is premixed with the epoxy resin, and the mixture is pre-cured.

25. A method of making an engineering material or an insulating material, the method comprising incorporating a potting composition into the engineering material or insulating material so that the material is suitable for the production of moldings and coatings in the electrical insulation sector, for the production of high-voltage insulation for outdoor use, for the production of outdoor insulators for high-voltage lines, these being longitudinal rod insulators, composite insulators, or cap-tight insulators, for post insulators in the medium-voltage sector, in the production of insulators for outdoor power switches, measurement transducers, feed-throughs, and suppressors, in switch gear construction, in power switches, dry-type transformers and electrical machines, or as coating materials for transistors and other semiconductor elements, or for impregnating electrical components, or as corrosion protection for metallic components, wherein the potting composition comprises (a) a three-dimensionally crosslinked polysiloxane in disperse form and with a particle size in the range from 0.02 μm to 50 μm, which, optionally, has reactive groups which can react chemically with the epoxy resin and/or the hardener, and (b) a selected linear or branched or cyclic polysiloxane compound which has reactive groups which can react chemically with the epoxy resin and/or the hardener, and optionally, (c) a low-molecular-weight oligomeric siloxane compound, wherein the three-dimensionally crosslinked polysiloxane (component (a)) is prepared separately in the form of a polysiloxane dispersion composed of an external phase and a dispersed phase, and is added to the epoxy potting composition or to a component of the composition prior to its curing, wherein the external phase of the polysiloxane dispersion is composed of from about 25 to 99.9% by weight of a polyol, which is liquid at temperatures of from 20° C. to 100° C., a linear or branched polyether glycol, a polyester which is reaction product of a polyol and an aliphatic dicarboxylic acid, a cycloaliphatic dicarboxylic acid, or an aromatic dicarboxylic acid, an acrylate polymer or copolymer capable of being used as a hardener in an epoxy resin system, a methacrylate polymer or copolymer capable of being used as a hardener in an epoxy resin system, or a mixture thereof.

26. Electrical insulation or an engineering component produced from the potting composition claimed in claim 1.

27. The potting composition as claimed in claim 2, wherein the at least one liner or branched aliphatic polyol is selected from the group consisting of ethylene glycol, diethylene glycol, a propylene glycol, a butylene glycol, 1,2-butanediol, 1,3-butanediol, 1,4-butanediol, neopentyl glycol, isopentyl glycol, 1,6-hexanediol, glycerol, hexanetriol, trimethylolethane, trimethylolpropane, erythritol, pentaerythritol, cyclohexanediol, or 1,4-dimethylolcyclohexane.

28. The potting composition as claimed in claim 6, wherein the dicarboxylic acid and/or polyfunctional carboxylic acid or the corresponding carboxylic anhydrides are selected from the group consisting of isophthalic acid, terephthalic acid, phthalic acid, methylphthalic acids, tetrahydrophthalic acid, hexahydrophthalic acid and methyltetrahydrophthalic acids.

29. The potting composition as claimed in claim 28, wherein the acids are selected from the group consisting of 4-methyltetrahydrophthalic acid, cyclohexanedicarboxylic acids, succinic acid, glutaric acid, adipic acid, pimelic acid, suberic acid, azelaic acid, sebacic acid, dodecanedicarboxylic acid, fumeric acid, maleic acid, and 4,4'-diphenyldicarboxylic acid.

30. The potting composition as claimed in claim 8, wherein the crosslinked polyorganosiloxanes particles have an average diameter of from 0.05 μm to 10 μm.

31. The potting composition as claimed in claim 8, wherein the crosslinked polyorganosiloxanes particles have an average diameter of from 0.07 μm to 5 μm.

32. The potting composition as claimed in claim 8, wherein the crosslinked polyorganosiloxanes particles have an average diameter of from 0.07 μm to 1 μm.

33. The potting composition as claimed in claim 12, wherein the silicon atoms of the three-dimensionally crosslinked organopolysiloxane have bonding optionally to an unfluorinated or fluorinated alkyl having from 1 to 4 carbon atoms or phenyl.

34. The potting composition as claimed in claim 12, wherein the silicon atoms of the three-dimensionally crosslinked organopolysiloxane have bonding optionally to 3,3,3-trifluoropropyl, monofluoromethyl, difluoromethyl, or alkyl having from 1 to 4 carbon atoms.

35. The potting composition as claimed in claim 12, wherein the silicon atoms of the three-dimensionally crosslinked organopolysiloxane have bonding optionally to methyl or phenyl.

36. The potting composition as claimed in claim 12, wherein the silicon atoms of the three-dimensionally crosslinked organopolysiloxane have bonding optionally to methyl.

37. The potting composition as claimed in claim 14, wherein the substituent formula (a) is 3-glycidoxypropyl.

38. The potting composition as claimed in claim 15, wherein the viscosity is in the range from 100 cSt to 10,000 cSt.

39. The potting composition as claimed in claim 38, wherein the viscosity is in the range from 500 cSt to 3,000 cSt.

40. The potting composition as claimed in claim 16, wherein R is an unfluorinated or fluorinated alkyl radical having from 1 to 4 carbon atoms, or phenyl.

41. The potting composition as claimed in claim 16, wherein R is phenyl, 3,3,3-trifluoropropyl, monofluoromethyl, difluoromethyl, or alkyl having from 1 to 4 carbon atoms.

42. The potting composition as claimed in claim 16, wherein R is methyl.

43. The potting composition as claimed in claim 16, wherein m has an average of from 20 to 5,000.

44. The potting composition as claimed in claim 16, wherein m has an average of from 2 to 20.

45. The potting composition as claimed in claim 16, wherein the total [m+n] for non-cyclic compounds is at least 50.

46. The potting composition as claimed in claim 17, wherein the general formula (I) is composed of from 4 to 12 —[Si(R)(R)O]— and/or —[SiR$_1$(R$_2$)O]— units.

47. The potting composition as claimed in claim 17, wherein the general formula (I) is composed of from 4 to 8 —[Si(R)(R)O]— and/or —[SiR$_1$(R$_2$)O]— units.

48. The potting composition as claimed in claim 18, wherein t is an integer from 4 to 8.

49. The potting composition as claimed in claim 19, wherein the entirety of components (a) and (b) amounts to from 0.5% by weight to 10% by weight.

50. The potting composition as claimed in claim 19, wherein the entirety of components (a) and (b) amounts to from 2% by weight to 5% by weight.

51. The potting composition as claimed in claim 20, wherein the ratio by weight of component (a) to component (b) is in the range from 5:1 to 2:1.

52. The potting composition as claimed in claim 20, wherein the ratio by weight of component (a) to component (b) is about 4.4:1.

53. The potting composition as claimed in claim 21, wherein the amount of the low-molecular-weight oligomeric siloxane compound is from 0.5% by weight to 5% by weight.

54. The potting composition as claimed in claim 21, wherein the amount of the low-molecular-weight oligomeric siloxane compound is about 1% by weight.

55. The potting composition as claimed in claim 22, wherein the filler is a powdered quartz, aluminum oxide and/or dolomite ground to various sizes.

56. The potting composition as claimed in claim 55, wherein the powdered quartz, aluminum oxide and/or dolomite is silanized.

\* \* \* \* \*